R. LATOUR.
COVER FOR PNEUMATIC TIRES.
APPLICATION FILED JAN. 20, 1910.
1,006,570.
Patented Oct. 24, 1911.
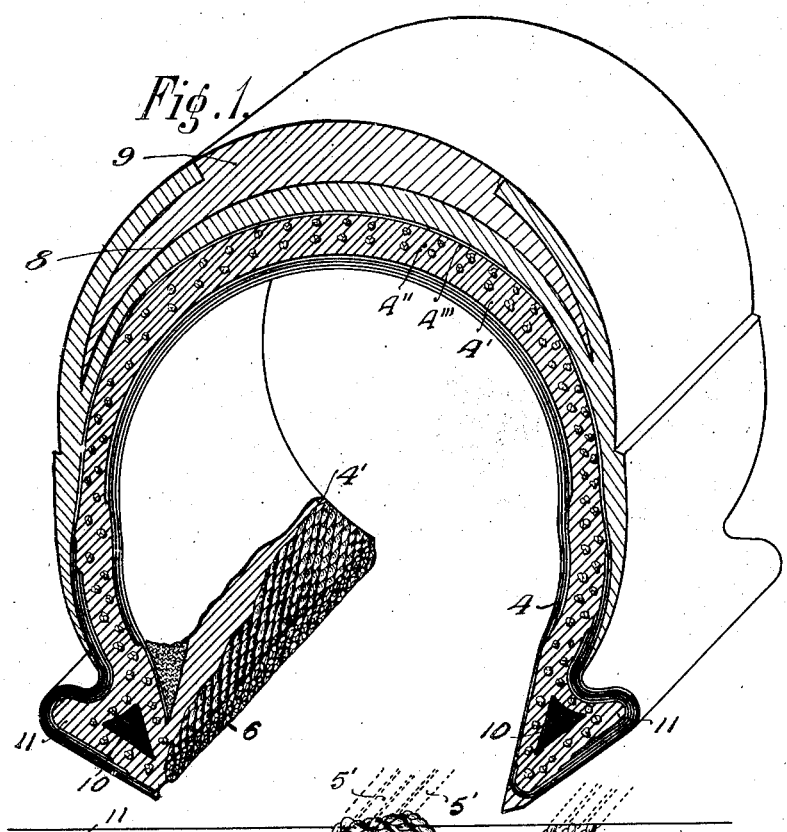
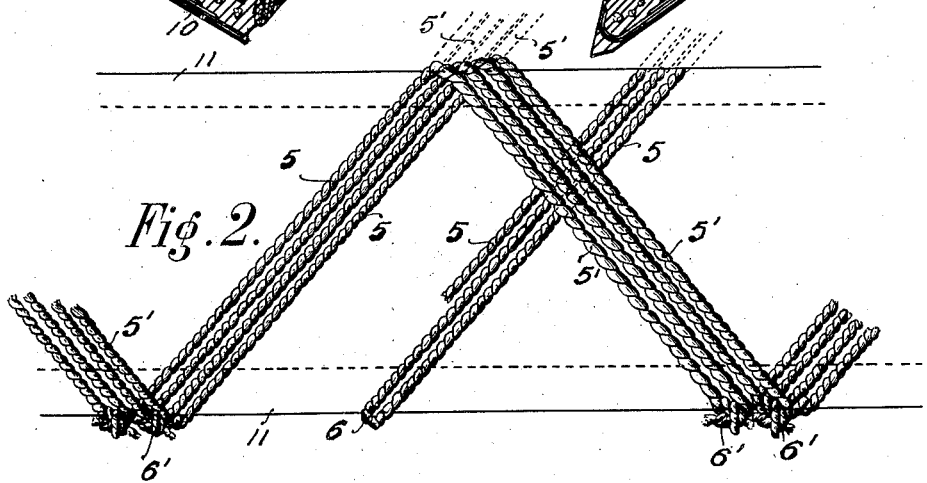
Inventor
Richard Latour,
By B. Singer. Attorney

UNITED STATES PATENT OFFICE.

RICHARD LATOUR, OF MENIN, BELGIUM.

COVER FOR PNEUMATIC TIRES.

1,006,570.　　　　　Specification of Letters Patent.　　Patented Oct. 24, 1911.

Application filed January 20, 1910. Serial No. 539,163.

*To all whom it may concern:*

Be it known that I, RICHARD LATOUR, a citizen of the Kingdom of Belgium, and a resident of 157 Chaussée d'Ypres, Menin, Belgium, have invented new and useful Improvements in Covers for Pneumatic Tires.

This invention has for its object an improved cover for pneumatic tires, the skeleton and shoulders of which are formed by a skeleton of cords in two or more crossed layers, the strands of which are completely embedded in a vulcanized mass of Pará indiarubber in such a way that two adjacent or superposed strands are always separated by a layer of indiarubber and in consequence can never rub one against the other as a result of the constant deformations of the cover.

Various arrangements of corded covers have already been proposed, but none have this isolation of each strand, nor the formation of the shoulders by the continuation of the corded skeleton of the body of the cover, which formation is one of the improved features of the present invention.

The invention will now be described with reference to the accompanying drawings which represent one form of construction as an example:—

Figure 1 is a section of the cover partially torn away to expose the corded skeleton; Fig. 2 shows the method of forming the said skeleton; Fig. 3 shows the method of attaching the corded elements of the lower layer to those of the upper crossed layer, which attachment is made at the shoulder side, that is to say in a part of the cover which is not deformed when in use.

In the drawings, 4 indicates one or more layers of canvas forming the inner wall of cover. This canvas is first arched and stretched over a wooden mold having the internal dimension of the cover, and then covered with a layer of Pará rubber 4'. On this Pará rubber covering is placed a layer formed of parallel strands of cord 5 arranged at a suitable inclination and leaving between them a certain vacant space. In order to form this first corded layer, the operation is as follows:—The cord is cut into pieces of equal length and the two ends of each piece are connected by a knot or splice 6. Each endless piece forming a double strand 5 5, 5' 5' is then stretched in its part 5, 5, as shown in Fig. 2, the portion 5' 5' remaining pendent. When all the layer of strands 5, 5, has been applied or fitted, the pendent portions 5' are taken and bent down forming a second corded layer crossing over relative to the strands of the first, as shown in Fig. 2, after the interposition of a second layer of Pará rubber 4''. The bending down is effected by passing them around a triangular band of vulcanized indiarubber 10 forming the core of the shoulders 11. The looped ends 6 of the cords of the lower layer 5 and those 6' of the upper layer 5' then come on the edge of the left shoulder (Fig. 2). It is sufficient to connect the ends 6, 6', by a lacing 7. A third layer of Pará rubber 4''' on the upper corded layer, then finally an outer cover 8 of canvas and a cap or tread 9 of softer indiarubber suffice for completing the cover, which is then vulcanized by the ordinary method.

Of course the strands of the upper layer 5', 5', are clearly separated one from another like those of the lower layer 5, so that after vulcanization each strand is completely embedded, which renders any friction of one strand against the other impossible.

Having now particularly described and ascertained the nature of my said invention and in what manner the same is to be performed, I declare that what I claim is:—

In a pneumatic tire, the combination with a rubber core in the form of the tire and having beaded margins, of forming bands for the said beaded margins, and reinforcing means for said tire, said reinforcing means including a series of cords arranged in parallel strands with looped ends, having their middle portions disposed in one of the beaded margins and about the forming band thereof, and extending diagonally in opposite directions through said core, in the other beaded margin and about the forming bead thereof, the looped end portions abutting each other within said beaded margin, and means connecting the looped end portions of the series of cords, combined substantially as described.

In testimony whereof I affix my signature in presence of two witnesses.

RICHARD LATOUR.

Witnesses:
 H. SABETTE,
 GREGORY PHELAN.